(12) United States Patent
Lim

(10) Patent No.: US 10,305,186 B2
(45) Date of Patent: May 28, 2019

(54) ELECTRONIC DEVICE INCLUDING RADIATING MEMBER

(71) Applicant: Samsung Electronics Co., Ltd., Gyeonggi-do (KR)

(72) Inventor: Young-Kon Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/788,609

(22) Filed: Oct. 19, 2017

(65) Prior Publication Data

US 2018/0108993 A1 Apr. 19, 2018

(30) Foreign Application Priority Data

Oct. 19, 2016 (KR) .................. 10-2016-0135448

(51) Int. Cl.
| | |
|---|---|
| *H01Q 7/00* | (2006.01) |
| *H01F 38/14* | (2006.01) |
| *H02J 7/02* | (2016.01) |
| *H01Q 1/24* | (2006.01) |
| *H04B 5/00* | (2006.01) |

(52) U.S. Cl.
CPC .............. *H01Q 7/00* (2013.01); *H01F 38/14* (2013.01); *H01Q 1/243* (2013.01); *H02J 7/025* (2013.01); *H04B 5/0081* (2013.01)

(58) Field of Classification Search
CPC .............. H01Q 7/00; H01Q 1/24; H04B 5/00
USPC ............................................. 343/867
See application file for complete search history.

(56) References Cited

U.S. PATENT DOCUMENTS

| | | | |
|---|---|---|---|
| 7,821,401 B2 | 10/2010 | Martin et al. | |
| 2008/0129439 A1 | 6/2008 | Nishikawa et al. | |
| 2010/0302039 A1* | 12/2010 | Goto | H01Q 7/00 340/572.7 |
| 2016/0028159 A1* | 1/2016 | Moon | H04B 5/0075 343/749 |

(Continued)

FOREIGN PATENT DOCUMENTS

| | | |
|---|---|---|
| JP | 5532678 B2 | 6/2014 |
| KR | 10-2016-0010264 A | 1/2016 |

(Continued)

OTHER PUBLICATIONS

Extended European Search Report regarding Application No. 17197253. 2, dated Mar. 2, 2018, 7 pages.

*Primary Examiner* — Andrea Lindgren Baltzell

(57) ABSTRACT

An electronic device includes a housing at least partially comprising a metal-material portion, a slit formed in the housing to traverse the metal-material portion along a first direction, and a radiating member, at least a portion is positioned on the slit. The radiating member includes a substrate, a first loop coil pattern formed on a first surface of the substrate, a second loop coil pattern formed on a second surface of the substrate that is opposite the first surface, a connection pattern formed on the first surface of the substrate and connected to each of the first loop coil pattern and the second loop coil pattern, and a bridge pattern formed on the second surface of the substrate and extending in a second direction intersecting the first direction. The bridge pattern bypasses the connection pattern, and is combined with the first loop coil pattern to form a loop coil antenna.

20 Claims, 8 Drawing Sheets

(56) References Cited

U.S. PATENT DOCUMENTS

2016/0254589 A1 9/2016 Ju et al.
2017/0331173 A1 11/2017 Ju et al.

FOREIGN PATENT DOCUMENTS

KR     20160011784 A    2/2016
WO      2016056736 A1    4/2016

\* cited by examiner

ELECTRONIC DEVICE INCLUDING RADIATING MEMBER

CROSS-REFERENCE TO RELATED APPLICATION AND CLAIM OF PRIORITY

This application is related to and claims priority to Korean Patent Application No. 10-2016-0135448 filed on Oct. 19, 2016, the contents of which are incorporated herein by reference.

TECHNICAL FIELD

Various embodiments of the present disclosure relate to an electronic device, for example, an electronic device including a radiating member for transmitting and receiving a radio signal (or wireless power).

BACKGROUND

With the common use of electronic devices carried by individuals, such as mobile communication terminals, various types of communication protocols using the electronic devices have been implemented. For example, various functions including wireless Internet connection through a private (wired/wireless) local area network (LAN), etc., as well as common-use communication network connection, user authentication using near-field communication (NFC), contactless credit card payment (e.g., magnetic secure transmission (MST)), wireless charging, etc., have been provided on the electronic devices to improve user convenience.

If one electronic device is capable of performing communication according to various types of communication protocols, user convenience may be correspondingly improved. When different types of communication protocols are implemented, different types of antenna devices, e.g., radiating members, may be needed in one electronic device. For example, on one electronic device may be mounted a radiating member for common-use communication network connection, a radiating member for wireless LAN connection, a radiating member for NFC, a radiating member for wireless charging, a radiating member for contactless credit card payment, and so forth.

As multiple different types of antenna devices are mounted on one electronic device, it may not be easy to secure an installation space for an antenna device. For example, in order for antenna devices to perform operations stably and independently of one another, a sufficient interval needs to be secured between the antenna devices or an electromagnetic shielding structure may be provided in an electronic device. However, it may be difficult to secure a sufficient interval among different antenna devices in a miniaturized electronic device such as a mobile communication terminal. In the miniaturized electronic device, there is a limitation in securing an interval between antenna devices (e.g., radiating members) or in providing a separate shielding structure, making it difficult to guarantee capabilities of an antenna device.

An electronic device such as a home appliance, a mobile communication terminal used by an individual carrying the same, etc., includes a case or a housing using a metal material (e.g., aluminum), realizing a sophisticated exterior. However, when an antenna device (e.g., a radiating member) is disposed in a case or a housing including a metal material, the radiating capability of the antenna device may be degraded; whereas when the antenna device is disposed outside the case or the housing, the exterior of the electronic device may be deteriorated.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide an electronic device including an antenna device (e.g., a radiating member) capable of showing stable performance even in a miniaturized electronic device.

Various embodiments of the present disclosure also provide an electronic device including an antenna device, which includes a case or a housing using a metal material to secure good radiating performance as well as a sophisticated exterior.

Moreover, various embodiments of the present disclosure provide an electronic device including an antenna device that is disposed inside a case or a housing using a metal material, thereby improving the use efficiency of an inner space of the case or the housing.

According to various embodiments of the present disclosure, an electronic device includes a housing at least partially including a metal-material portion, a slit formed in the housing to traverse the metal-material portion along a first direction, and a radiating member, at least a portion of which being positioned on the slit, in which the radiating member includes a substrate, a first loop coil pattern formed on a first surface of the substrate, a second loop coil pattern formed on a second surface of the substrate that is opposite the first surface, a connection pattern formed on the first surface of the substrate and connected to each of the first loop coil pattern and the second loop coil pattern, and a bridge pattern formed on the second surface of the substrate and extending in a second direction intersecting the first direction, and in which the bridge pattern bypasses the connection pattern to connect a portion of the first loop coil pattern with another portion of the first loop coil pattern, and is combined with the first loop coil pattern to form a loop coil antenna.

According to various embodiments of the present disclosure, an electronic device includes a housing at least partially including a metal-material portion, a slit formed on the housing to traverse the metal-material portion along a first direction and dividing the metal-material portion into a first portion at a side and a second portion at the other side, a through-hole formed in the second portion, and a radiating member, at least a portion of which being positioned on the slit, in which the radiating member includes a substrate, a first loop coil pattern formed on a first surface of the substrate and at least partially disposed around the through-hole in the second portion, a second loop coil pattern formed on a second surface of the substrate that is opposite the first surface and at least partially disposed around the through-hole in the second portion, a connection pattern formed on the first surface of the substrate and connected to each of the first loop coil pattern and the second loop coil pattern, and a bridge pattern formed on the second surface of the substrate and extending in a second direction intersecting the first direction, and in which the bridge pattern bypasses the connection pattern to connect a portion of the first loop coil pattern with another portion of the first loop coil pattern, and is combined with the first loop coil pattern to form a loop coil antenna, and the second loop coil pattern includes a conductive wire extending in a spiral shape on the second surface, and the bridge pattern includes conductive wires formed between arrangements of the conductive wire of the second loop coil pattern.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

Figure 1:
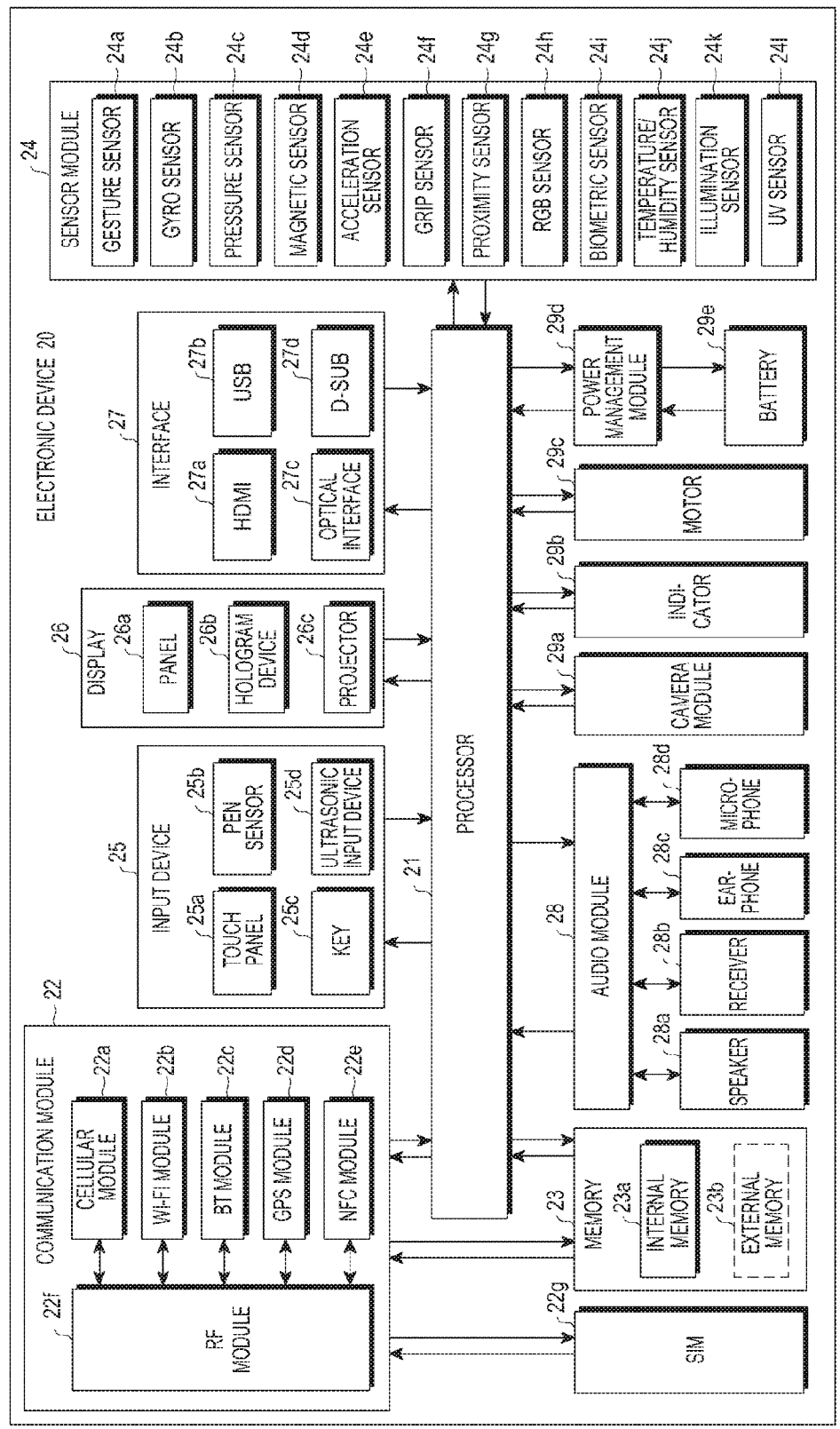
FIG. 1 illustrates a block diagram of an electronic device according to various embodiments of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Although ordinal numbers such as "first", "second", and so forth will be used to describe various components of the present disclosure, those components are not limited by the terms. These terms may be used for the purpose of distinguishing one element from another element. For example, a first element may be named as a second element without departing from the right scope of the various exemplary embodiments of the present disclosure, and similarly, a second element may be named as a first element. The term "and/or" includes a combination of a plurality of related provided items or any one of the plurality of related provided items.

Relative terms used based on illustration in the drawings, such as a "front side", a "rear side", a "top surface", a "bottom surface", and the like, may be replaced with ordinal numbers such as "first", "second", and the like. The order of the ordinal numbers such as "first", "second", and the like is a mentioned order or an arbitrarily set order, and may be changed as needed.

The terms used in the various exemplary embodiments of the present disclosure are for the purpose of describing particular exemplary embodiments only and are not intended to be limiting. The singular forms are intended to include the plural forms as well, unless the context clearly indicates otherwise. The term "include" or "has" used in the present disclosure is to indicate the presence of features, numbers, steps, operations, elements, parts, or a combination thereof described in the specifications, and does not preclude the presence or addition of one or more other features, numbers, steps, operations, elements, parts, or a combination thereof.

All of the terms used herein including technical or scientific terms have the same meanings as those generally understood by an ordinary skilled person in the related art unless they are defined other. The terms defined in a generally used dictionary should be interpreted as having meanings that are the same as or similar with the contextual meanings of the relevant technology and should not be interpreted as having ideal or exaggerated meanings unless they are clearly defined in the present disclosure.

In the present disclosure, an electronic device may be an arbitrary device having a touch panel and may be referred to as a terminal, a portable terminal, a mobile terminal, a communication terminal, a portable communication terminal, a portable mobile terminal, a display, or the like.

For example, the electronic device may be a smart phone, a cellular phone, a navigation device, a game console, a television (TV), a vehicle head unit, a laptop computer, a tablet computer, a personal media player (PMP), a personal digital assistant (PDA), or the like. The electronic device may be implemented with a pocket-size portable communication terminal having a wireless communication function. The electronic device may be a flexible device or a flexible display.

The electronic device may communicate with an external electronic device such as a server or may work by cooperating with the external electronic device. For example, the electronic device may transmit an image captured by a camera and/or position information detected by a sensor unit to the server over a network. A network may be, but not limited to, a mobile or cellular communication network, a local area network (LAN), a wireless local area network (WLAN), a wide area network (WAN), Internet, a small area network (SAN), or the like.

FIG. 1 illustrates a block diagram of an electronic device 20 according to various embodiments of the present disclosure. The electronic device 20 may include the entire electronic device to be described later (e.g., an electronic device 100 of FIG. 2) or a part thereof. The electronic device 20 may include one or more processors (e.g., application processors (APs)) 21, a communication module 22, a subscriber identification module (SIM) 22g, a memory 23, a sensor module 24, an input device 25, a display 26, an interface 27, an audio module 28, a camera module 29a, a power management module 29d, a battery 29e, an indicator 29b, and a motor 29c. The processor 21 controls multiple hardware or software components connected to the processor 21 by driving an Operating System (OS) or an application program, and performs processing and operations with respect to various data. The processor 21 may be implemented with, for example, a system on chip (SoC). According to an embodiment of the present disclosure, the electronic device 20 may include a GPU and/or an image signal processor. The processor 21 may include at least some of the elements illustrated in FIG. 1 (e.g., the cellular module 22a). The processor 21 loads a command or data received from at least one of other elements (e.g., a non-volatile memory) into a volatile memory to process the command or data, and stores result data in the non-volatile memory.

The communication module 22 may include, for example, at least one of the cellular module 22a, a WiFi module 22b, a Bluetooth (BT) module 22c, a GNSS module 22d, a near field communication (NFC) module 22e, and a radio frequency (RF) module 22f. The cellular module 22a may provide, for example, a voice call, a video call, a text service, or an Internet service over a communication network. According to an embodiment, the cellular module 22a identifies and authenticates the electronic device 20 in a communication network by using the SIM 22g (e.g., a SIM card). According to an embodiment, the cellular module 22a performs at least one of functions that may be provided by the processor 21. According to an embodiment, the cellular module 22a may include a communication processor (CP). According to an embodiment, at least some (e.g., two or more) of the cellular module 22a, the WiFi module 22b, the BT module 22c, the GNSS module 22d, and the NFC module 22e may be included in one integrated chip (IC) or IC package. The RF module 22f may, for example, transmit and receive a communication signal (e.g., an RF signal). The RF module 22f may include a transceiver, a power amp module (PAM), a frequency filter, a low noise amplifier (LNA), or an antenna. According to another embodiment, at least one of the cellular module 22a, the WiFi module 22b, the BT module 22c, the GNSS module 22d, and the NFC module 22e may transmit and receive an RF signal through the separate RF module. The SIM 22g may, for example, include a card including an SIM or an embedded SIM, and may include unique identification information (e.g., an integrated circuit card identifier (ICCID) or subscriber information (e.g., an international mobile subscriber identity (IMSI)).

The memory 23 may include an internal memory 23a or an external memory 23b. The internal memory 23a may, for example, include at least one of a volatile memory (e.g., dynamic random access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, a flash memory, and a solid state drive (SSD). The external memory 23b may further include flash drive, for example, compact flash (CF), secure digital (SD), micro-SD, mini-SD, extreme Digital (xD), a multi-media card (MMC), or a memory stick. The external memory 23b may be functionally or physically connected with the electronic device 20 through various interfaces.

The sensor module 24 measures physical quantity or senses an operation state of the electronic device 20 to convert the measured or sensed information into an electric signal. The sensor module 24 may, for example, include at least one of a gesture sensor 24a, a gyro sensor 24b, a pressure sensor 24c, a magnetic sensor 24d, an acceleration sensor 24e, a grip sensor 24f, a proximity sensor 24g, a color sensor 24h (e.g., Red Green Blue (RGB) sensor), a biometric sensor 24i, a temperature/humidity sensor 24j, an illumination sensor 24k, and a ultraviolet (UV) sensor 24l. Additionally or alternatively, the sensor module 24 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 24 may further include a control circuit for controlling at least one sensor included therein. In an embodiment, the electronic device 20 may further include a processor configured to control the sensor module 24 as part of or separately from the processor 21, to control the sensor module 24 during a sleep state of the processor 21.

The input device 25 may include, for example, a touch panel 25a, a (digital) pen sensor 25b, a key 25c, or an ultrasonic input device 25d. The touch panel 25a may use at least one of a capacitive type, a resistive type, an IR type, or an ultrasonic type. The touch panel 25a may further include a control circuit. The touch panel 25a may further include a tactile layer to provide tactile reaction to the user. The (digital) pen sensor 25b may be a part of the touch panel 25a or may include a separate recognition sheet. The key 25c may also include, for example, a physical button, an optical key, or a keypad. The ultrasonic input device 25d senses ultrasonic waves generated by an input means through a microphone (e.g., the microphone 28d) and checks data corresponding to the sensed ultrasonic waves.

The display 26 may include a panel 26a, a hologram device 26b, a projector 26c, and/or a control circuit for controlling them. The panel 26a may be implemented to be flexible, transparent, or wearable. The panel 26a may be configured with the touch panel 25a in one module. According to an embodiment, the panel 26a integrated with the touch panel 25a may include a pressure sensor (or a "force sensor", interchangeably used hereinafter) capable of measuring a strength of a pressure by a user's touch. The pressure sensor may be implemented integrally with the touch panel 25a or may be implemented as one or more sensors separate from the touch panel 25a. The hologram device 26b shows a stereoscopic image in the air by using interference of light. The projector 26c displays an image onto an external screen through projection of light. The screen may be positioned inside or outside the electronic device 20. According to an embodiment, the interface 27 may include a high-definition multimedia interface (HDMI) 27a, a universal serial bus (USB) 27b, an optical communication 27c, or a D-subminiature 27d. Additionally or alternatively, the interface 27 may include, for example, an MHL interface, an SD card/MMC interface, or an IrDA standard interface.

The audio module 28 bi-directionally converts sound and an electric signal. The audio module 28 processes sound information input or output through the speaker 28a, the receiver 28b, the earphone 28c, or the microphone 28d. The camera module 29a is, for example, a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.). The power management module 29d manages power of the electronic device 20. According to an embodiment, the power management module 29d may include a power management integrated circuit (PMIC), a charger IC, or a battery fuel gauge. The PMIC may have a wired and/or wireless charging scheme. The wireless charging scheme includes a magnetic-resonance type, a magnetic induction type, and an electromagnetic type, and for wireless charging, an additional circuit, for example, a coil loop, a resonance circuit, or a rectifier may be further included. The battery gauge measures the remaining capacity of the battery 29e or the voltage, current, or temperature of the battery 29e during charging. The battery 29e may include a rechargeable battery and/or a solar battery.

The indicator 29b displays a particular state, for example, a booting state, a message state, or a charging state, of the electronic device 20 or a part thereof (e.g., the processor 21). The motor 29c converts an electric signal into mechanical vibration or generates vibration or a haptic effect. The electronic device 20 may include a device for supporting the mobile TV (e.g., a GPU) to process media data according to a standard such as digital multimedia broadcasting (DMB), digital video broadcasting (DVB), or mediaFlo™. Each of the foregoing elements described herein may be configured with one or more components, names of which may vary with a type of the electronic device. In various embodiments, some components of the electronic device (e.g., the electronic device 20) may be omitted or may further include other elements, and some of the components may be coupled to form one entity and identically perform functions of the components before being coupled.

Figure 2:
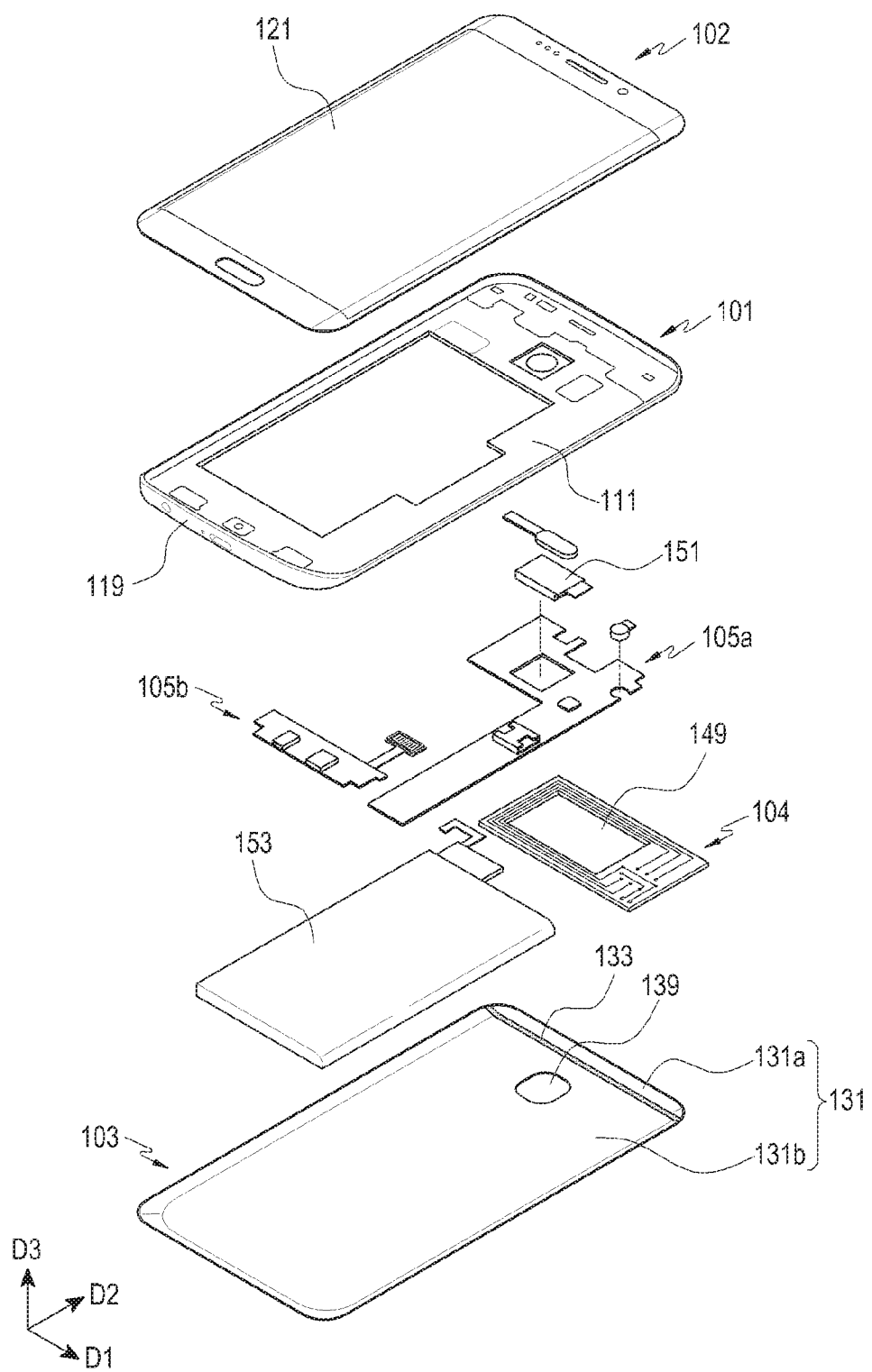
FIG. 2 illustrates an exploded perspective view of an electronic device according to various embodiments of the present disclosure.

FIG. 2 illustrates an exploded perspective view of the electronic device 100 according to various embodiments of the present disclosure.

In FIG. 2, reference numeral 'D1', a first direction, may indicate, for example, a width direction of the housing. Reference numeral 'D2', a second direction, may indicate, for example, a length direction of the housing. Reference numeral 'D3', a third direction, may indicate, for example, a thickness direction of the housing.

Referring to FIG. 2, the electronic device 100 according to various embodiments of the present disclosure, which is, for example, a mobile communication terminal, may include a housing 101, a display device 102 (e.g., the display 26 of FIG. 1), a rear cover 103, and a radiating member 104. The housing 101 accommodates at least one circuit board 105a or 105b and includes a support member 111 to support the display device 102 and/or the circuit board 105a or 105b. The support member 111 may substantially have a flat panel shape disposed to face the display device 102. In another embodiment, a portion, for example, at least a portion of an edge of the support member 111 may have a curved surface shape, and the display device 102 may include a curved surface portion corresponding to the support member 111.

According to various embodiments, the housing 101 forms a body of the electronic device 100, and may accommodate, for example, the one circuit board 105a or 105b. The support member 111 is formed in the housing 101 to supplement and improve the rigidity of the electronic device 100, and separates installation spaces of some electronic parts from each other. For example, the support member 111 may separate an installation space of the display device 102 from an installation space of an integrated circuit (IC) chip such as a processor (e.g., the processor 21 of FIG. 1) or the like (for example, a space where the circuit board 105a or 105b is disposed) to prevent another electronic part from interfering with the display device 102. In an embodiment, the support member 111 may be provided as a structure for mounting a camera module 151, etc., thereon. In another embodiment, the camera module 151 may be mounted on one of the circuit boards 105a and 105b, and the support member 111 may include an accommodating hole (or groove) capable of accommodating a portion of the camera module 151.

In an embodiment, the housing 101 may be at least partially manufactured using a metal material, and at least a portion of the metal material may be used as a portion (e.g., a radiating conductor) of an antenna device. For example, the metal material portion provided as the radiating conductor may form at least a portion of a sidewall portion 119 of the housing 101. If the sidewall portion 119 is provided as the radiating conductor, the sidewall portion 119 may be insulated from another metal material portion of the housing 101.

According to various embodiments, the display device 102 is mounted on a front surface of the housing 101 to form an exterior of the electronic device 100 together with at least a portion of the housing 101, and may include, for example, a window member 121 in which a display panel (e.g., the panel 26a of FIG. 1) is integrated. In an embodiment, the display device 102 may include the display panel or a touch panel (e.g., the touch panel 25a of FIG. 1) integrated in the window member 121. For example, the display device 102 may be used as an input device for obtaining a user's touch input as well as an output device for outputting a screen in the electronic device 100.

According to various embodiments, the rear cover 103 is mounted on a rear surface of the housing 101 to form the exterior of the electronic device 100 together with at least a portion of the housing 101 and/or at least a portion of the display device 102. In an embodiment, the rear cover 103 may be provided removable from the housing 101, and the user may attach or detach various storage medium (e.g., a card on which the SIM 22g of FIG. 1 is mounted, the external memory 23b, etc.) or replace a battery 153 (e.g., the battery 29e of FIG. 1) after removing the rear cover 103. In another embodiment, the rear cover 103 forms a uni-body with the housing 101, such that the user may not be able to replace the battery 153 arbitrarily.

In an embodiment, the rear cover 103 may be a portion of the housing 101. For example, in a detailed embodiment of the present disclosure, the housing 101 and the rear cover 103 are described as separate elements, but the rear cover 103 may include a metal material portion 131 and may form a uni-body with the housing 101 or may be a portion of the housing 101. According to an embodiment, the housing 101, e.g., the rear cover 103 may include a slit 133 extending globally along a first direction D1. For example, the slit 133 may be formed to traverse the metal material portion 131 along a width direction of the housing 101 and/or the rear cover 103. In an embodiment, the rear cover 103 may include a combination of a first portion 131a formed at a side of the slit 133 and a second portion 131b formed at the other side of the slit 133. In an embodiment, the rear cover 103 may include a through-hole 139 corresponding to the camera module 151 to provide a path through which image information is incident to the camera module 151. The through-hole 139 may be formed, for example, in the second portion 131b, and the first portion 131a may be provided as a radiating conductor for communication, such as a wireless LAN, Bluetooth, a global positioning system (GPS), a common-use communication network, etc. For example, the first portion 131a may be insulated from the second portion 131b by the slit 133.

According to various embodiments, the radiating member 104 has a flat panel shape attached onto the rear cover 103, and may transmit and receive a radio signal for, for example, NFC. In an embodiment, the radiating member 104 may include an opening 149. For example, the radiating member 104 may be formed in a position corresponding to the camera module 151, and may include the opening 149 for providing a path through which image information is incident. As will be described below, the radiating member 104 may include loop coil pattern(s) disposed along a circumference of the through-hole 139 and/or the opening 149.

According to various embodiments, at least a portion of an antenna device, e.g., the radiating member 104 may be positioned on the slit 133 to transmit and receive a radio signal through the slit 133. For example, if the radiating member 104 is disposed on the metal material portion, the metal material portion of the housing 101 may be an obstacle to transmission and reception of a radio signal, but the radiating member 104 is at least partially disposed on the slit 133 and thus stably transmits and receives a radio signal through the slit 133. In an embodiment, the slit 133 may be filled with an insulating member that insulates the first portion 131a from the second portion 131b and passes a radio signal there through. For example, the insulating member filled in the slit 133 may include polycarbonate, and may also include glass fiber, etc., to secure mechanical strength and so forth.

According to an embodiment, the battery 153, a portion of the radiating member 104, and the camera module 151 may be sequentially arranged along a second direction D2 (e.g., a length direction of the housing 101). For instance, a portion of the radiating member 104 may be disposed between the battery 153 and the camera module 151. In an embodiment, as an interval between the camera module 151 and the battery 153 decreases, it may be more desirable to secure the capacity of the battery 153. For example, for a smaller area occupied by the portion of the radiating member 104 between the camera module 151 and the battery 153, the capacity of the battery 153 may be expanded.

In an embodiment, a portion of the radiating member 104 may be disposed overlappingly with the battery 153 to reduce the interval between the battery 153 and the camera module 151. However, for a constant thickness of the electronic device 100, if the portion of the radiating member 104 overlaps the battery 153, the thickness of the battery 153 may decrease. If the portion of the radiating member 104 is disposed overlappingly with the battery 153, the interval between the camera module 151 and the battery 153 decreases, but the thickness of the battery 153 decreases, substantially making it difficult to expand the capacity of the battery 153. In various embodiments of the present disclosure, the radiating member 104 is formed using a loop coil pattern (e.g., a loop coil-type antenna) connected in parallel, and the area occupied by the radiating member 104 between the camera module 151 and the battery 153 is reduced, contributing to expansion of the capacity of the battery 153. Such a structure of the radiating member 104 will be described in more detail with reference to FIGS. 4 through 8.

Figure 3:
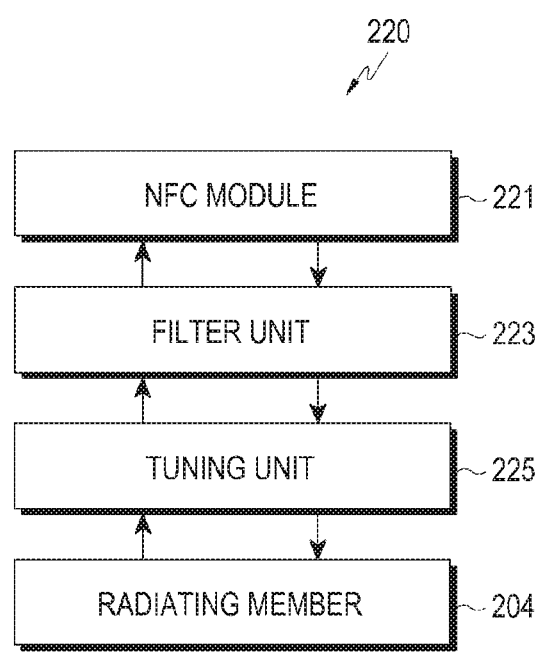
FIG. 3 illustrates a block diagram of an antenna device of an electronic device according to various embodiments of the present disclosure.

FIG. 3 illustrates a block diagram of an antenna device 220 of the electronic device according to various embodiments of the present disclosure.

Referring to FIG. 3, the antenna device 220 of an electronic device (e.g., the electronic device 100 of FIG. 2) according to various embodiments of the present disclosure may include, for example, an NFC module 221, a filter unit 223, a tuning unit 225, and the radiating member 204 (e.g., the radiating member 104 of FIG. 2).

The NFC module 221 performs signal encoding/decoding for NFC, and may include a transmission power amplifier and a receiver block for providing an interface with the radiating member 204. The transmission power amplifier of the NFC module 221 amplifies a transmission power in a reader mode to expand a distance and/or a range of NFC. The receiver block of the NFC module 221 may receive information transmitted from a tag after the transmission power is output in the reader mode. The information transmitted from the tag (e.g., the radio signal received through the radiating member 204) may be directly delivered to the NFC module 221 (e.g., the receiver block) without passing through the filter unit 223 or the tuning unit 225. In an embodiment, the NFC module 221 may further include a card block. For example, if the electronic device (e.g., the electronic device 100 of FIG. 2) is set in a card mode, the NFC module 221 may transmit credit card information, user authentication information, etc., embedded in the electronic device 100 to an external device (e.g., a Point of Sale (POS) terminal) and the card block of the NFC module 221 may receive information about approval of credit payment, etc.

The filter unit 223 may include a low pass filter including a resistive element, an inductive element, a capacitive element, and so forth, and may remove an unnecessary frequency band. The tuning unit 225 performs fine tuning with respect to a resonant frequency by using the resistive element, the inductive element, and the capacitive element, and may tune the resonant frequency of the antenna device 220 to a frequency band of about 13.8 MHz for NFC communication.

The radiating member 204, for example, the radiating member 104 of FIG. 2, transmits a radio signal under control of the NFC module 221 and receives a radio signal from an external device (e.g., a tag, a POS terminal, etc.). The radiating member 204 includes a plurality of loop coil patterns connected in parallel and thus has a low electric resistance value, thereby securing good power efficiency.

While the radiating member 204 is connected with the NFC module 221 as an example, the present disclosure is not necessarily limited to this example. For example, the NFC module 221 may be replaced with a power management module (e.g., the power management module 29d of FIG. 1), and in this case, the radiating member 204 may receive a wireless power and provide the same as a charging power of the battery (e.g., the battery 153 of FIG. 2).

Figure 4:
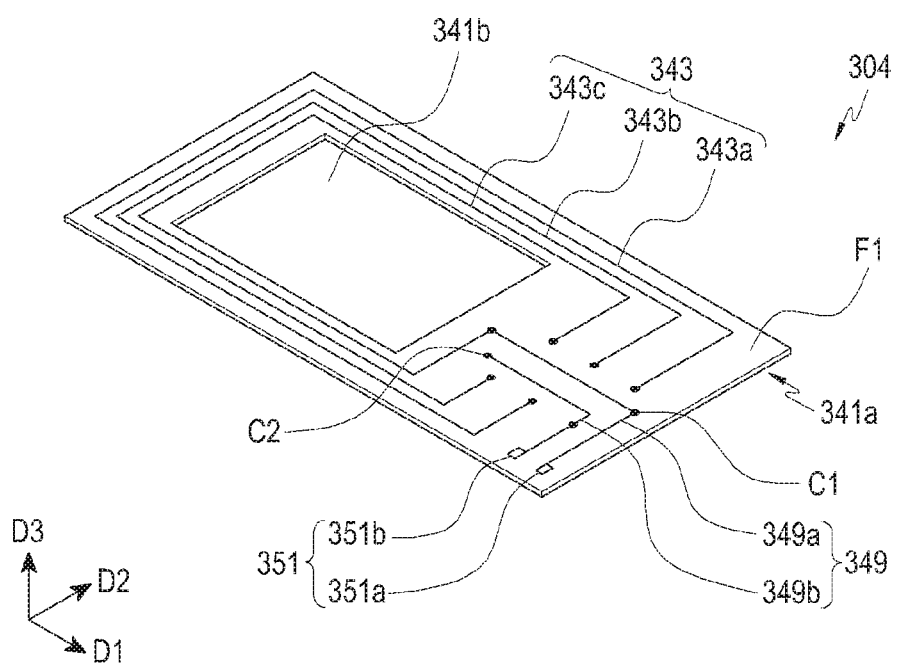
FIG. 4 illustrates a perspective view of a radiating member of an electronic device according to various embodiments of the present disclosure.
Figure 5:
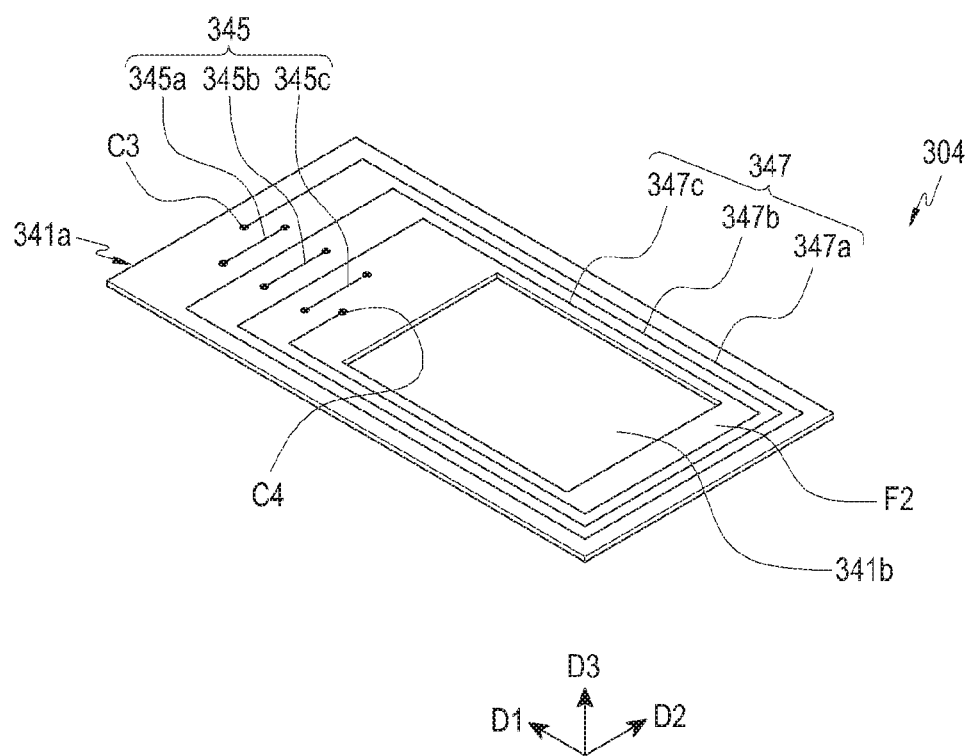
FIG. 5 illustrates a perspective view of a radiating member of an electronic device according to various embodiments of the present disclosure, which is viewed from another direction.
Figure 6:
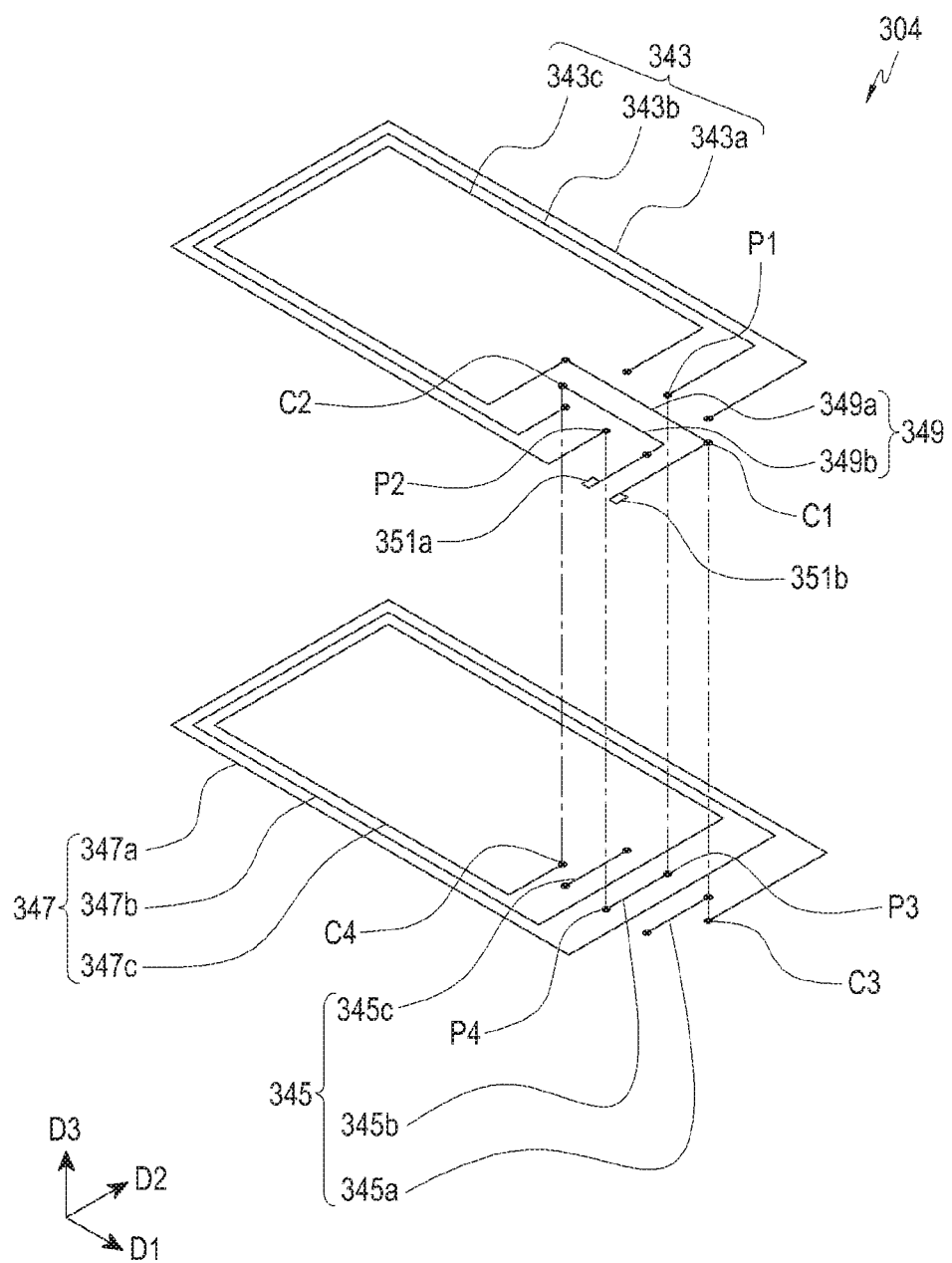
FIG. 6 illustrates a perspective view for describing a structure of a radiating member of an electronic device according to various embodiments of the present disclosure.

FIG. 4 illustrates a perspective view of a radiating member 304 of the electronic device according to various embodiments of the present disclosure. FIG. 5 illustrates a perspective view of the radiating member 304 of the electronic device according to various embodiments of the present disclosure, which is viewed from another direction. FIG. 6 illustrates a perspective view for describing a structure of the radiating member 304 of the electronic device according to various embodiments of the present disclosure.

When the radiating member 304 according to the current embodiment is described, elements of the electronic device 100 of FIG. 2 may be referred to if necessary.

Referring to FIGS. 4 through 6, the radiating member 304 (e.g., the radiating member 104 of FIG. 2) may include a first loop coil pattern 343 formed on a first surface F1 of a substrate 341a, a second loop coil pattern 347 formed on a second surface F2 of the substrate 341a, and a bridge pattern 345 formed on the second surface F2 and connected with the first loop coil pattern 343. The bridge pattern 345, e.g., a conductive wire(s) 345a, 345b, and 345c forming the bridge pattern 345 may extend along the second direction D2, e.g., the length direction of the housing 101, and a plurality of conductive wires may be arranged along the first direction D1. In an embodiment, the conductive wire(s) 345a, 345b, and 345c forming the bridge pattern 345 extends in a direction intersecting the extending direction of the slit (e.g., the slit 133 of FIG. 2) and is arranged along the extending direction of the slit.

The substrate 341a may be formed of, for example, a polyimide film, and may include an opening 341b corresponding to the through-hole 139. For example, the substrate 341a may have a globally flat panel shape and may be disposed to at least partially surround a region or a space where the camera module 151 is disposed. According to an embodiment, the first surface F1 may mean a surface disposed to face an inner side of the housing 101, for example, the support member 111 and/or the circuit board 105a or 105b, and the second surface F2 may mean a surface that is opposite to the first surface F1, for example, a surface that faces the rear cover 103. However, an ordinal number such as 'first', 'second', etc., mentioned in a detailed embodiment of the present disclosure is given for brevity of a description or to merely distinguish similar elements, and the present disclosure is not limited to the ordinal number. In an embodiment, a portion of the radiating member 304, e.g., the substrate 341a may be disposed between a region where the battery 153 is mounted and a region where the camera module 151 is mounted.

According to various embodiments, as shown in FIG. 4, the first loop coil pattern 343 may include at least one conductive wires 343a, 343b, and 343c that are formed and arranged to form a trajectory in a globally rectangular shape on the first surface F1 of the substrate 341a. The conductive wires 343a, 343b, and 343c may extend or may be arranged to form a globally coil shape on the first surface F1 of the substrate 341a. As will be described later, the first loop coil pattern 343 may be combined with the bridge pattern 345 to form a radiating conductor in a spiral coil shape. On the first surface F1 of the substrate 341a may be provided a connection pattern 349 including a pair of conductive wires 349a and 349b.

According to various embodiments, the second loop coil pattern 347 may include conductive wires 347a, 347b, and 347c that are formed to have a printed circuit pattern in a globally planar coil shape on the second surface F2 of the substrate 341a. The second loop coil pattern 347 forms a loop coil antenna (e.g., a radiating conductor) alone, and conductive wire(s) may extend and be arranged to form a globally rectangular shape. For example, although portions of the second loop coil pattern 347 are indicated by '347a', '347b', and '347c', the second loop coil pattern 347 may include substantially one conductive wire.

According to an embodiment, the bridge pattern 345 may be formed on the second surface F2 of the substrate 341a, and may include a plurality of conductive wires 345a, 345b, and 345c extending along the second direction D2 (and/or arranged along the first direction D1). The bridge pattern 345 bypasses the connection pattern 349 to connect a portion of the first loop coil pattern 343 with another portion of the first loop coil pattern 343, and is combined with the first loop coil pattern 343 to form a loop coil antenna. In an embodiment, the conductive wires 345a, 345b, and 345c of the bridge pattern 345 may be formed between arrangements of the conductive wires 347a, 347b, and 347c of the second loop coil pattern 347, respectively. For example, on the second surface F2, the conductive wires 345a, 345b, and 345c of the bridge pattern 345 and portion(s) of the conductive wire of the second loop coil pattern 347 may be arranged alternately.

In an embodiment, the first direction D1 may be the width direction of the housing 101, and the second direction D2 may be the length direction of the housing 101. For example, the first direction D1 and the second direction D2 may intersect each other substantially perpendicularly to each other. In an embodiment, the bridge pattern 345 and/or the conductive wires 345a, 345b, and 345c of the bridge pattern 345 do not have to extend perpendicularly to the first direction D1. For example, depending on an exterior design of the electronic device (e.g., the electronic device 100 of FIG. 2) or arrangement of the camera module, the battery, etc., the bridge pattern 345 and/or the conductive wires 345a, 345b, and 345c of the bridge pattern 345 may extend in an inclined direction, rather than perpendicularly, with respect to the first direction D1.

According to various embodiments, the first conductive wire 345a of the bridge pattern 345 connects the first connection conductive wire 349a of the connection pattern 349 with an end of the first conductive wire 343a of the first loop coil pattern 343, and the second conductive wire 345b of the bridge pattern 345 connects the other end of the first conductive wire 343a of the first loop coil pattern 343 with an end of the second conductive wire 343b of the first loop coil pattern 343, and the third conductive wire 345c of the bridge pattern 345 connects the other end of the second conductive wire 343b of the first loop coil pattern 343 with an end of the third conductive wire 343c of the first loop coil pattern 343. The second connection conductive wire 349b of the connection pattern 349 may be connected to the other end of the third conductive wire 343c of the first loop coil pattern 343 on the first surface F1.

According to an embodiment, the first loop coil pattern 343 and the connection pattern 349 may be formed and arranged along trajectories that partially intersect each other on the first surface F1. In an embodiment, on the first surface F1, in a region where the connection pattern 349 is formed, the conductive wires of the first loop coil pattern 343 are short-circuited and bypass the connection pattern 349 through the bridge pattern 345, such that the short-circuited portions of conductive wire(s) of the first loop coil pattern 343 are connected with each other. For example, the first loop coil pattern 343 may be combined with the bridge pattern 345 to form a loop coil antenna (e.g., a radiating conductor). The connection pattern 349 may include connection pad(s) 351 formed in an end portion of each of the conductive wires 349a and 349b, and the conductive wires forming each of the connection pattern 349, the first loop coil pattern 343, and the bridge pattern 345 are connected in series to complete a coil connecting a first connection pad 351a and a second connection pad 351b of the connection pads 351.

In an embodiment, at least a portion of the conductive wires 347a, 347b, and 347c of the second loop coil pattern 347 may be disposed to correspond to at least a portion of the conductive wires 343a, 343b, and 343c of the first loop coil pattern 343. Herein, when "at least a portion of the conductive wires of the second loop coil pattern 347 is disposed to correspond to at least a portion of the conductive wires of the first loop coil pattern 343", it may mean that when viewed as a top plan view, a portion of the conductive wire(s) of the first loop coil pattern 343 overlaps a portion of the conductive wire of the second loop coil pattern 347. For example, when viewed from the first surface F1 and/or the second surface F2 (e.g., when projected), the first loop coil pattern 343 and the second loop coil pattern 347 may at least partially overlap each other. Hereinafter, a 'region where the first loop coil pattern and the second loop coil pattern overlap each other' will be referred to as an 'overlapping region' (e.g., an overlapping region O of FIG. 7).

According to various embodiments, an end C3 of the second loop coil pattern 347 may be connected to a portion C1 of the first connection conductive wire 349a through a via hole penetrating the substrate 341a and/or a conductor filled in the via hole. The other end C4 of the second loop coil pattern 347 may be connected to an end portion C2 of the second connection conductive wire 349b through another via hole penetrating the substrate 341a and/or a conductor filled in the another via hole. For example, the second loop coil pattern 347 may form the loop coil antenna alone, and may be connected to the connection pattern 349. In an embodiment, the loop coil antenna including a combination of the first loop coil pattern 343 and the bridge pattern 345 is connected to the connection pattern 349, such that the radiating member 304 may include a structure in which two loop coil antennas are connected in parallel. For example, the radiating member 304, by including radiating conductors connected in parallel, may lower resistances of the radiating conductors, thus improving power efficiency in transmission and reception of a radio signal.

In an embodiment, the connection pads 351 provided in the connection pattern 349 are connected to the circuit board (e.g., the circuit board 105a or 105b of FIG. 2) through a connecting terminal (e.g., a c-clip), etc., mounted on the circuit board. The radiating member 304 is connected to the communication module (e.g., the NFC module 221 of FIG. 3) or the power management module (e.g., the power management module 29d of FIG. 2) of the electronic device, for example, through the connection pads 351.

Figure 7:
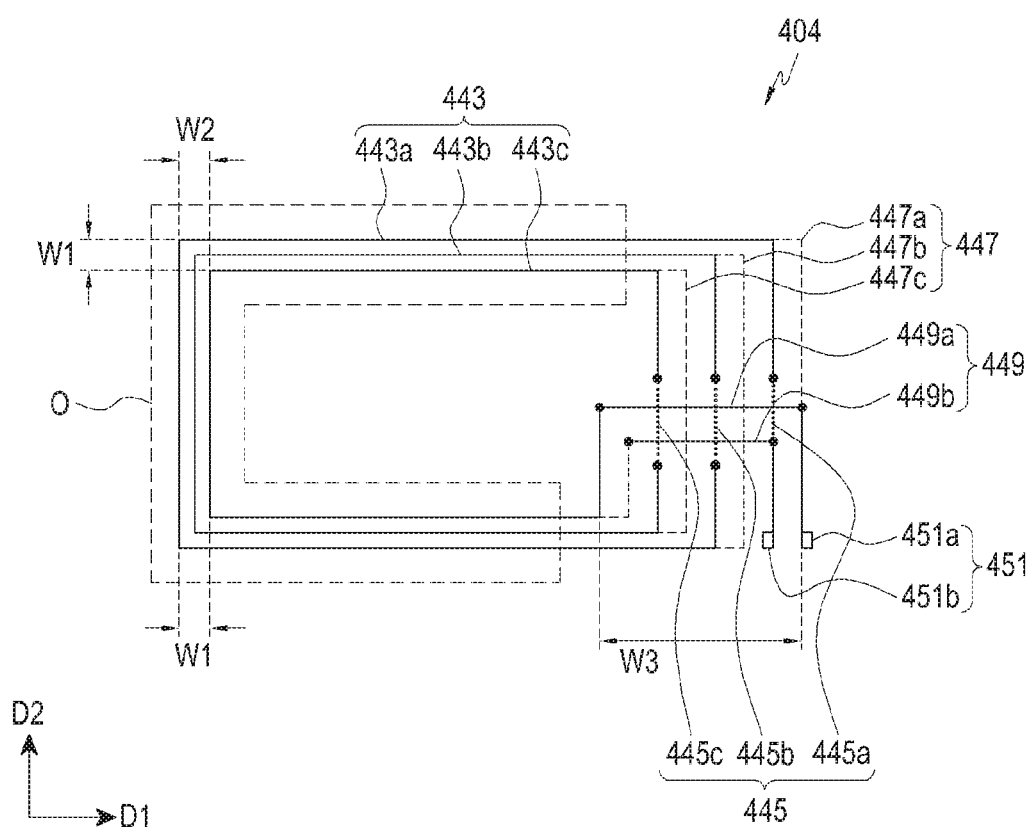
FIG. 7 illustrates a top plan view for describing a structure of a radiating member of an electronic device according to various embodiments of the present disclosure.
Figure 8:
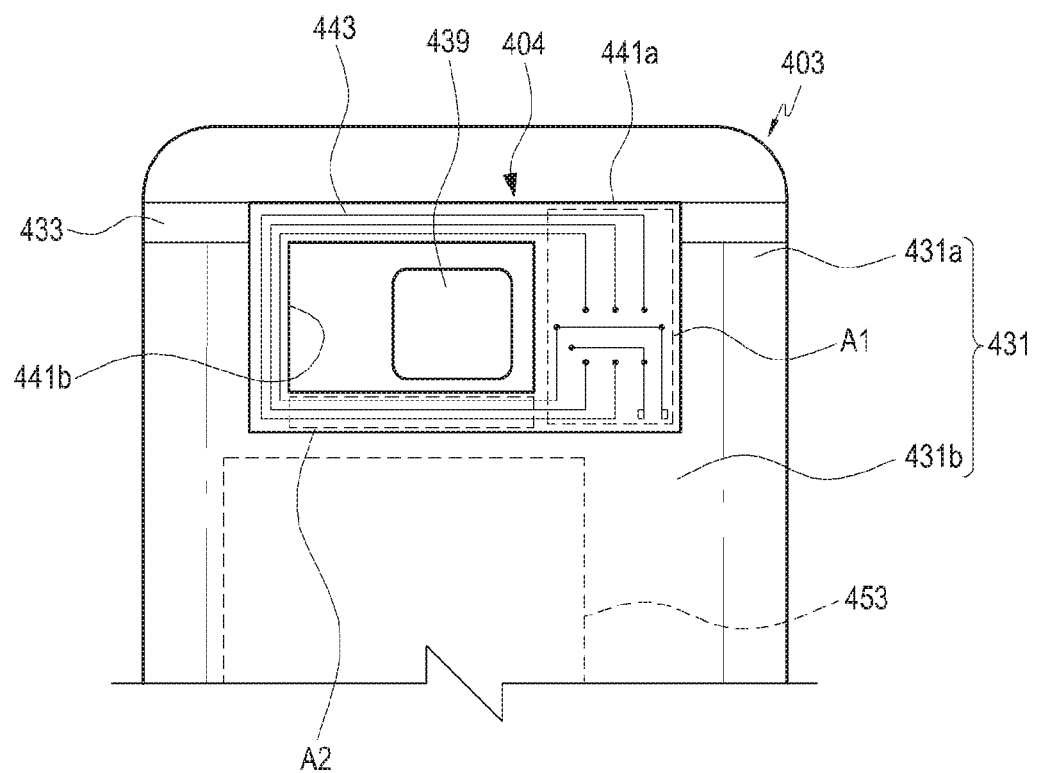
FIG. 8 illustrates a top plan view showing a state where a radiating member of an electronic device is disposed according to various embodiments of the present disclosure.

FIG. 7 illustrates a top plan view for describing a structure of the radiating member 404 of the electronic device according to various embodiments of the present disclosure. FIG. 8 illustrates a top plan view showing a state where the radiating member 404 of the electronic device is disposed according to various embodiments of the present disclosure.

Referring to FIGS. 7 and 8, the radiating member 404 (e.g., the radiating member 304 of FIG. 4 or 5) may include a first loop coil pattern 443, a second loop coil pattern 447, a bridge pattern 445, and a connection pattern 449. The first loop coil pattern 443 and the connection pattern 449 are formed on a first surface (e.g., the first surface F1 of FIG. 4) on a substrate of the radiating member 404, and the bridge pattern 445 and the second loop coil pattern 447 are formed on a second surface (e.g., the second surface F2 of FIG. 5) on the substrate of the radiating member 404.

On a surface (e.g., the first surface F1 of FIG. 4) of a substrate, trajectories of conductive wires 443a, 443b, and 443c of the first loop coil pattern 443 and trajectories of conductive wires 449a and 449b of the connection pattern 449 intersect one another, but the first loop coil pattern 443 may not be formed in a region where the connection pattern 449 is formed. For example, the first loop coil pattern 443 may extend in such a way that the plurality of conductive wires 443a, 443b, and 443c substantially form a rectangular shape and/or an alphabet 'C' and one conductive wire extends and is arranged around another conductive wire. The first conductive wire 443a of the first loop coil pattern 443 is connected to the first connection conductive wire 449a of the connection pattern 449 through a first conductive wire 445a of the bridge pattern 445. For example, the first conductive wire 445a of the bridge pattern 445 may connect the first conductive wire 443a of the first loop coil pattern 443 to the first connection conductive wire 449a by bypassing the second connection conductive wire 449b of the connection pattern 449. The second conductive wire 445b of the bridge pattern 445 may connect the first conductive wire 443a and the second conductive wire 443b of the first loop coil pattern 443 by bypassing the second connection conductive wire 449b of the connection pattern 449. The third conductive wire 445c of the bridge pattern 445 may connect the second conductive wire 443b and the third conductive wire 443c of the first loop coil pattern 443 by bypassing the connection pattern 449. The third conductive wire 443c of the first loop coil pattern 443 is connected to the second connection conductive wire 449b of the connection pattern 449 on a surface of a substrate.

On the other surface (e.g., the second surface F2 of FIG. 5) of the substrate, the second loop coil pattern 447 may form a loop coil antenna including substantially one conductive wire. In at least a partial region (e.g., the overlapping region O), the second loop coil pattern 447 is formed to globally correspond to the first loop coil pattern 443. As stated above, when "the second loop coil pattern 447 is formed to globally correspond to the first loop coil pattern 443", it may mean that when viewed from a surface or the other surface of a substrate (or when projected), the second loop coil pattern 447 and the first loop coil pattern 443 substantially match each other. According to an embodiment, at least a portion of the first loop coil pattern 443 and/or the second loop coil pattern 447 is disposed on a slit 433 formed in a housing 403 of an electronic device.

According to another embodiment, another portion of the first loop coil pattern 443 and/or the second loop coil pattern 447 is disposed between a region where a camera module is disposed (e.g., a region where a through-hole 439 is formed in the housing 403) and a region where a battery 453 is disposed. For example, different portions of the radiating member 404, e.g., the overlapping region O may be disposed between the region where the camera module is disposed and the region where the battery 453 is disposed and/or on the slit 433 of the housing.

The slit 433 may be formed to traverse a metal material portion 431 of the housing 403 (e.g., the rear cover 103 of FIG. 2) and may be filled with an insulating member. In an embodiment, a portion of the radiating member 104, e.g., the overlapping region O may be disposed on the slit 433 to transmit and receive a radio signal through the slit 433.

On the other surface of the substrate, the conductive wires 445a, 445b, and 445c of the bridge pattern 445 may be formed between arrangements of the conductive wires 447a, 447b, and 447c of the second loop coil pattern 447, respectively. For example, when viewed as a top plan view as shown in FIG. 7, the conductive wires of the bridge pattern 445 may be arranged to form straight lines with a portion of the conductive wires of the first loop coil pattern 443 and may be disposed between the conductive wire(s) of the second loop coil pattern 447. According to an embodiment, in the overlapping region O, a width W1 to which the conductive wires of the first loop coil pattern 443 are arranged and a width W2 to which the conductive wires of the second loop coil pattern 447 are arranged may be narrow. On the other hand, in the region where the bridge pattern 445 is arranged, the conductive wire of the second loop coil pattern 447 and the conductive wires of the bridge pattern 445 may be formed and arranged in a region having the width W2 that is wider than the overlapping region O. For example, in the overlapping region O, arrangements of the conductive wires of the first loop coil pattern 443 and/or the second loop coil pattern 447 may be formed to have a narrower width than the arrangements of the conductive wires of the bridge pattern 445 and the conductive wire of the second loop coil pattern 447.

Referring to FIG. 8, on the housing 403 (e.g., the rear cover 103 of FIG. 2), a portion of the overlapping region O, the region where the camera module is mounted (e.g., the through-hole 439 of the housing), another portion A2 of the overlapping region O, and the battery 453 (or a battery mounting region) may be sequentially arranged along the second direction D2. As mentioned previously, for a smaller interval between the through-hole 439 (e.g., the camera module or a mounting region of the camera module) and the battery 453 decreases, a larger mounting space (or a capacity) of the battery 453 may be secured. According to various embodiments of the present disclosure, the another portion A2 of the overlapping region O is positioned between the through-hole 439 and the battery 453 while the radiating member 404 is disposed, thereby securing a sufficient battery mounting region (or space).

According to an embodiment, a region where an arrangement width of conductive wires is wide (e.g., a region A1 where the conductive wires of the bridge pattern 445 and the conductive wire of the second loop coil pattern 447 are arranged alternately) may be disposed at a side of the region where the camera module is mounted (e.g., the region where the through-hole is formed). For example, at the side of the region where the through-hole 439 is formed, designing of arrangement of the conductive wires of the bridge pattern 445 and the conductive wire of the second loop coil pattern 447 may be free relatively (e.g., when compared to a region between the through-hole 439 and the battery 453).

In another embodiment, a portion of the radiating member 404 (e.g., conductive wires (or a portion of each of the conductive wires) that are formed on the overlapping region O and form a portion of the first loop coil pattern 443 and/or the second loop coil pattern 447) may be disposed on the slit 433 to transmit and receive a radio signal through the slit 433. In an embodiment, a first portion 431a of the metal material portion 431 of the housing 403 may form a radiating conductor (e.g., a radiating conductor for Bluetooth communication, a radiating conductor for wireless LAN communication, a radiating conductor for a GPS, and a radiating conductor for common-use communication). According to various embodiments, the conductive wires of the radiating member 404 may be disposed in a region of the slit 433 without overlapping the first portion 431a. For example, the first portion 431a and the conductive wires of the radiating member 404 used as a radiating conductor may be disposed in adjacent to each other without overlapping each other, thus suppressing electromagnetic interference therebetween and enabling stable wireless communication. Moreover, the radiating member 404 is disposed on the metal material portion 431, such that a sufficient number of and sufficient arrangement of conductive wires of the radiating member 404 are arranged on the slit 433 and perform wireless communication through the slit 433.

As described above, when the radiating member 404 is disposed between arrangements of the first portion 431a of the metal material portion used as the radiating conductor, the camera module, the battery, etc., in a length direction (e.g., the second direction D2) of the housing 403, the radiating member 404 includes a loop coil antenna having a parallel structure, thereby alleviating narrowing of a mounting space of the battery 453, etc. For example, the electronic device according to various embodiments of the present disclosure may easily secure a mounting space for a battery, etc., while including an additional radiating member disposed therein.

In another embodiment, in a region between the camera module and the battery or a portion disposed on the slit, it may be easy to reduce an arrangement width (e.g., a width 'W1' of FIG. 7) of wire(s) of the loop coil antenna. For example, a loop coil antenna is formed on each of both surfaces of one substrate and/or each of both surfaces of one layer of a multi-layer circuit board, the loop coil antennas formed on the both surfaces of the substrate are connected in parallel, facilitating installation in a small region.

In an embodiment, conductive wires of a loop coil antenna, which are connected in parallel, are disposed on a slit without overlapping nearby another radiating conductor, thereby performing stable transmission and reception of a radio signal. For example, when compared to a general planar coil antenna, the radiating member (e.g., the loop coil antenna having a parallel connection structure) according to various embodiments of the present disclosure may have a low electric resistance value, thus improving power efficiency, and also may have a high arrangement density of conductive wires on a slit through which a radio signal passes, thus improving wireless communication efficiency.

As described above, an electronic device according to various embodiments of the present disclosure includes a housing at least partially including a metal-material portion, a slit formed in the housing to traverse the metal-material portion along a first direction, and a radiating member, at least a portion of which being positioned on the slit, in which the radiating member includes a substrate, a first loop coil pattern formed on a first surface of the substrate, a second loop coil pattern formed on a second surface of the substrate that is opposite the first surface, a connection pattern formed on the first surface of the substrate and connected to each of the first loop coil pattern and the second loop coil pattern, and a bridge pattern formed on the second surface of the substrate and extending in a second direction intersecting the first direction, and in which the bridge pattern bypasses the connection pattern to connect a portion of the first loop coil pattern with another portion of the first loop coil pattern, and is combined with the first loop coil pattern to form a loop coil antenna.

According to various embodiments, the first loop coil pattern may include at least one conductive wires arranged in a spiral shape on the first surface, and a portion of each of the conductive wires of the first loop coil pattern may be disposed on the slit.

According to various embodiments, the second loop coil pattern may include a conductive wire extending in a spiral shape on the second surface, and a portion of the conductive wire of the second loop coil pattern may be disposed on the slit.

According to various embodiments, the second loop coil pattern may include a conductive wire extending in a spiral shape on the second surface, and the bridge pattern may include a plurality of conductive wires arranged along the first direction on the second surface, and the conductive wires of the bridge pattern may be formed between arrangements of the conductive wire of the second loop coil pattern.

According to various embodiments, the first loop coil pattern may include at least one first conductive wires arranged in a spiral shape on the first surface, and the second loop coil pattern may include a second conductive wire extending in a spiral shape on the second surface, and the bridge pattern may include third conductive wires formed between arrangements of the conductive wire of the second loop coil pattern, and at least a portion of the second conductive wire may be disposed to correspond to the first conductive wire.

According to various embodiments, the first direction may be a width direction of the housing, and the second direction may be a length direction of the housing.

According to various embodiments, the housing may include, as the metal-material portion, a first portion positioned at a side of the slit and a second portion positioned at the other side of the slit, and the radiating member may be disposed on the second portion such that a portion of the radiating member is disposed on the slit.

According to various embodiments, the first portion may form any one of a radiating conductor for Bluetooth communication, a radiating conductor for wireless LAN communication, a radiating conductor for a GPS, and a radiating conductor for common-use communication.

According to various embodiments, the housing may include, as the metal-material portion, a first portion positioned at a side of the slit and a second portion positioned at the other side of the slit, and a through-hole formed in the second portion, and the first loop coil pattern and the second loop coil pattern may be at least partially disposed around the through-hole in the second portion, and a portion of each of the first loop coil pattern and the second loop coil pattern may be disposed on the slit.

According to various embodiments, the radiating member may form any one of a radiating conductor for NFC, a radiating conductor for contactless credit card payment, and a radiating conductor for wireless charging.

According to various embodiments, the slit may be filled with an insulating member.

According to various embodiments of the present disclosure, an electronic device includes a housing at least partially including a metal-material portion, a slit formed on the housing to traverse the metal-material portion along a first direction and dividing the metal-material portion into a first portion at a side and a second portion at the other side, a through-hole formed in the second portion, and a radiating member, at least a portion of which being positioned on the slit, in which the radiating member includes a substrate, a first loop coil pattern formed on a first surface of the substrate and at least partially disposed around the through-hole in the second portion, a second loop coil pattern formed on a second surface of the substrate that is opposite the first surface and at least partially disposed around the through-hole in the second portion, a connection pattern formed on the first surface of the substrate and connected to each of the first loop coil pattern and the second loop coil pattern, and a bridge pattern formed on the second surface of the substrate and extending in a second direction intersecting the first direction, and in which the bridge pattern bypasses the connection pattern to connect a portion of the first loop coil pattern with another portion of the first loop coil pattern, and is combined with the first loop coil pattern to form a loop coil antenna, and the second loop coil pattern includes a conductive wire extending in a spiral shape on the second surface, and the bridge pattern includes conductive wires formed between arrangements of the conductive wire of the second loop coil pattern.

According to various embodiments, the first loop coil pattern may include at least one conductive wires arranged in a spiral shape on the first surface, and a portion of the conductive wire of the first loop coil pattern may be disposed on the slit, and another portion thereof may be disposed on the second portion.

According to various embodiments, a portion of the conductive wire of the second loop coil pattern may be disposed on the slit and another portion thereof may be disposed in the second portion.

According to various embodiments, the first loop coil pattern may include at least one first conductive wires arranged in a spiral shape on the first surface, and at least a portion of the conductive wire of the second loop coil pattern may be disposed to correspond to the first conductive wire.

According to various embodiments, the first conductive wire and the at least a portion of the conductive wire of the second loop coil pattern, which are disposed to correspond to each other, may be disposed on the slit.

According to various embodiments, the first direction and the second direction may intersect perpendicular to each other.

According to various embodiments, the slit may be filled with an insulating member.

In an electronic device according to various embodiments of the present disclosure, loop coil patterns formed on a surface and the other surface of a substrate, e.g., a polyimide film, are connected in parallel, thus forming a radiating member for NFC, a radiating member for contactless credit card payment, and/or a radiating member for wireless charging. As the loop coil patterns are connected in parallel, a resistance of the radiating member is lowered, alleviating a loss of signal power. For example, power efficiency of the radiating member may be improved. According to an embodiment, the electronic device passes a radio signal (or power) of the radiating member through a slit formed to traverse the metal material portion of the housing, thereby making the exterior elegant and providing stable radiating performance with the housing of the metal material. According to various embodiments, a part of the metal-material portion at a side of the slit may be used as a radiating conductor for communication in another frequency band such as a wireless LAN, Bluetooth, a GPS, a common-use communication network, etc., thereby implementing various types of communication protocols in one electronic device. According to an embodiment, the conductive wire of the bridge pattern of the radiating member extends in a direction intersecting the extending direction of the slit and is arranged along the extending direction of the slit, making it easy to secure the mounting space of other electronic parts such as the battery, etc. For example, an antenna device (e.g., a radiating member) of an electronic device according to various embodiments of the present disclosure may improve the degree of freedom of designing in the shape or disposition of other electronic parts may be improved and thus the efficiency of use of an inner space of the housing may be improved.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   a housing at least partially comprising a metal-material portion;
   a slit formed in the housing to traverse the metal-material portion along a first direction; and
   a radiating member, at least a portion is positioned on the slit,
   wherein the radiating member comprises:
      a substrate;
      a first loop coil pattern formed on a first surface of the substrate;
      a second loop coil pattern formed on a second surface of the substrate that is opposite the first surface;
      a connection pattern formed on the first surface of the substrate and connected to each of the first loop coil pattern and the second loop coil pattern; and
      a bridge pattern formed on the second surface of the substrate and extending in a second direction intersecting the first direction, and
      wherein the bridge pattern bypasses the connection pattern to connect a portion of the first loop coil pattern with another portion of the first loop coil pattern, and is combined with the first loop coil pattern to form a loop coil antenna.

2. The electronic device of claim 1, wherein:
   the first loop coil pattern comprises at least one conductive wires arranged in a spiral shape on the first surface, and
   a portion of each of the conductive wires of the first loop coil pattern is disposed on the slit.

3. The electronic device of claim 1, wherein:
   the second loop coil pattern comprises a conductive wire extending in a spiral shape on the second surface, and
   a portion of the conductive wire of the second loop coil pattern is disposed on the slit.

4. The electronic device of claim 1, wherein:
   the second loop coil pattern comprises a conductive wire extending in a spiral shape on the second surface,
   the bridge pattern comprises a plurality of conductive wires arranged along the first direction on the second surface, and
   the conductive wires of the bridge pattern are formed between arrangements of the conductive wire of the second loop coil pattern.

5. The electronic device of claim 1, wherein:
   the first loop coil pattern comprises at least one first conductive wires arranged in a spiral shape on the first surface,
   the second loop coil pattern comprises a second conductive wire extending in a spiral shape on the second surface,
   the bridge pattern comprises third conductive wires formed between arrangements of the conductive wire of the second loop coil pattern, and
   at least a portion of the second conductive wire is disposed to correspond to the first conductive wire.

6. The electronic device of claim 1, wherein:
   the first direction is a width direction of the housing, and the second direction is a length direction of the housing.

7. The electronic device of claim 1, wherein:
   the housing comprises, as the metal-material portion, a first portion positioned at a side of the slit and a second portion positioned at the other side of the slit, and
   the radiating member is disposed on the second portion such that a portion of the radiating member is disposed on the slit.

8. The electronic device of claim 7, wherein the first portion forms at least one of a radiating conductor for Bluetooth communication, a radiating conductor for wireless local area network (LAN) communication, a radiating conductor for a global positioning system (GPS), and a radiating conductor for common-use communication.

9. The electronic device of claim 1, wherein:
   the housing comprises a first portion positioned at a side of the slit and a second portion positioned at the other side of the slit as the metal-material portion, and a through-hole formed in the second portion,
   the first loop coil pattern and the second loop coil pattern are at least partially disposed around the through-hole in the second portion, and
   a portion of each of the first loop coil pattern and the second loop coil pattern is disposed on the slit.

10. The electronic device of claim 9, wherein the radiating member forms at least one of a radiating conductor for near field communication (NFC), a radiating conductor for contactless credit card payment, and a radiating conductor for wireless charging.

11. The electronic device of claim 1, wherein the slit is filled with an insulating member.

12. An electronic device comprising:
    a housing at least partially comprising a metal-material portion;
    a slit formed on the housing to traverse the metal-material portion along a first direction and dividing the metal-material portion into a first portion at a side and a second portion at the other side;
    a through-hole formed in the second portion; and
    a radiating member, at least a portion is positioned on the slit,
    wherein the radiating member comprises:
       a substrate;
       a first loop coil pattern formed on a first surface of the substrate and at least partially disposed around the through-hole in the second portion;

a second loop coil pattern formed on a second surface of the substrate that is opposite the first surface and at least partially disposed around the through-hole in the second portion;

a connection pattern formed on the first surface of the substrate and connected to each of the first loop coil pattern and the second loop coil pattern; and a bridge pattern formed on the second surface of the substrate and extending in a second direction intersecting the first direction, wherein the bridge pattern bypasses the connection pattern to connect a portion of the first loop coil pattern with another portion of the first loop coil pattern, and is combined with the first loop coil pattern to form a loop coil antenna, wherein the second loop coil pattern comprises a conductive wire extending in a spiral shape on the second surface, and wherein the bridge pattern comprises conductive wires formed between arrangements of the conductive wire of the second loop coil pattern.

13. The electronic device of claim 12, wherein:

the first loop coil pattern comprises at least one conductive wires arranged in a spiral shape on the first surface, and a portion of the conductive wire of the first loop coil pattern is disposed on the slit, and another portion thereof is disposed on the second portion.

14. The electronic device of claim 12, wherein a portion of the conductive wire of the second loop coil pattern is disposed on the slit and another portion thereof is disposed in the second portion.

15. The electronic device of claim 12, wherein:

the first loop coil pattern comprises at least one first conductive wires arranged in a spiral shape on the first surface, and at least a portion of the conductive wire of the second loop coil pattern is disposed to correspond to a first conductive wire.

16. The electronic device of claim 15, wherein the first conductive wire and the at least a portion of the conductive wire of the second loop coil pattern, that are disposed to correspond to each other, are disposed on the slit.

17. The electronic device of claim 12, wherein the first direction and the second direction intersect perpendicular to each other.

18. The electronic device of claim 12, wherein the slit is filled with an insulating member.

19. The electronic device of claim 12, wherein the first portion forms any at least one of a radiating conductor for Bluetooth communication, a radiating conductor for wireless local area network (LAN) communication, a radiating conductor for a global positioning system (GPS), and a radiating conductor for common-use communication.

20. The electronic device of claim 12, wherein the radiating member forms at least one of a radiating conductor for near field communication (NFC), a radiating conductor for contactless credit card payment, and a radiating conductor for wireless charging.

* * * * *